US009268655B2

(12) United States Patent
Chan et al.

(10) Patent No.: US 9,268,655 B2
(45) Date of Patent: Feb. 23, 2016

(54) INTERFACE FOR RESOLVING SYNCHRONIZATION CONFLICTS OF APPLICATION STATES

(71) Applicant: NEXTBIT SYSTEMS INC., San Francisco, CA (US)

(72) Inventors: Michael A. Chan, San Francisco, CA (US); Linda Tong, San Francisco, CA (US)

( * ) Notice: Subject to any disclaimer, the term of this patent is extended or adjusted under 35 U.S.C. 154(b) by 75 days.

(21) Appl. No.: 14/042,398

(22) Filed: Sep. 30, 2013

(65) Prior Publication Data

US 2014/0095929 A1   Apr. 3, 2014

Related U.S. Application Data

(60) Provisional application No. 61/708,794, filed on Oct. 2, 2012, provisional application No. 61/804,134, filed on Mar. 21, 2013.

(51) Int. Cl.
G06F 11/00 (2006.01)
G06F 11/14 (2006.01)
G06F 11/16 (2006.01)
G06F 17/30 (2006.01)

(52) U.S. Cl.
CPC ........ *G06F 11/1471* (2013.01); *G06F 11/1438* (2013.01); *G06F 11/1662* (2013.01); *G06F 17/30174* (2013.01)

(58) Field of Classification Search
CPC  G06F 9/4856; G06F 11/1438; G06F 11/1662
See application file for complete search history.

(56) References Cited

U.S. PATENT DOCUMENTS

| 6,811,486 | B1 | 11/2004 | Luciano, Jr. |
| 7,315,740 | B2 * | 1/2008 | Maes .......................... 455/432.1 |
| 7,326,117 | B1 | 2/2008 | Best |
| 7,490,045 | B1 | 2/2009 | Flores et al. |
| 7,774,457 | B1 | 8/2010 | Talwar et al. |
| 7,903,383 | B2 | 3/2011 | Fukano et al. |
| 8,005,956 | B2 | 8/2011 | Williams et al. |

(Continued)

FOREIGN PATENT DOCUMENTS

EP      2680207 A1    1/2014

OTHER PUBLICATIONS

Final Office Action mailed Jul. 24, 2014, U.S. Appl. No. 14/179,709 by Quan, J., et al., filed Feb. 13, 2014.

(Continued)

*Primary Examiner* — Charles Ehne

(57) ABSTRACT

Technology is disclosed herein for resolving synchronization conflicts when synchronizing application state data between computing devices. According to at least one embodiment, a server detects a first set of application state data at a first computing device conflicting with a second set of application state data at a second computing device. The first and second sets of application state data represent application states of the same computer application running at the first and second computing devices, respectively. Accordingly, the first computing device presents a user interface prompting a user to choose a preferred set of application state data between the first and second sets of application state data. If the user chooses the second set of application state data as the preferred set, the first computing device uses the second set of application state data to overwrite the first set of application state data at the device.

22 Claims, 16 Drawing Sheets

(56) References Cited

U.S. PATENT DOCUMENTS

| | | |
|---|---|---|
| 8,234,348 B1 | 7/2012 | Tulchinsky et al. |
| 8,290,920 B2 * | 10/2012 | Mahajan et al. ............... 707/703 |
| 8,315,977 B2 | 11/2012 | Anand et al. |
| 8,423,511 B1 | 4/2013 | Bhatia |
| 8,438,298 B2 | 5/2013 | Arai et al. |
| 8,473,577 B2 | 6/2013 | Chan |
| 8,475,275 B2 | 7/2013 | Weston et al. |
| 8,478,816 B2 * | 7/2013 | Parks et al. .................... 709/203 |
| 8,494,576 B1 | 7/2013 | Bye et al. |
| 8,495,129 B2 | 7/2013 | Wolman et al. |
| 8,515,902 B2 | 8/2013 | Savage |
| 8,539,567 B1 | 9/2013 | Logue et al. |
| 8,577,292 B2 | 11/2013 | Huibers |
| 8,589,140 B1 | 11/2013 | Poulin |
| 8,606,948 B2 | 12/2013 | Evans et al. |
| 8,666,938 B1 * | 3/2014 | Pancholy ....................... 707/610 |
| 8,747,232 B1 | 6/2014 | Quan et al. |
| 8,764,555 B2 | 7/2014 | Quan et al. |
| 8,775,449 B2 | 7/2014 | Quan et al. |
| 8,812,601 B2 | 8/2014 | Hsieh et al. |
| 8,840,461 B2 | 9/2014 | Quan et al. |
| 8,868,859 B2 | 10/2014 | Schmidt et al. |
| 2001/0039212 A1 | 11/2001 | Sawano et al. |
| 2002/0161908 A1 | 10/2002 | Benitez et al. |
| 2003/0069037 A1 | 4/2003 | Kiyomoto et al. |
| 2004/0018876 A1 | 1/2004 | Kubota et al. |
| 2004/0203381 A1 | 10/2004 | Cahn et al. |
| 2005/0147130 A1 | 7/2005 | Hurwitz et al. |
| 2006/0030408 A1 | 2/2006 | Kiiskinen |
| 2006/0073788 A1 | 4/2006 | Halkka et al. |
| 2007/0130217 A1 | 6/2007 | Linyard et al. |
| 2008/0055311 A1 | 3/2008 | Aleksic et al. |
| 2008/0220878 A1 | 9/2008 | Michaelis |
| 2009/0063690 A1 | 3/2009 | Verthein et al. |
| 2009/0077263 A1 | 3/2009 | Koganti et al. |
| 2009/0106110 A1 | 4/2009 | Stannard et al. |
| 2009/0204966 A1 * | 8/2009 | Johnson et al. ............... 718/100 |
| 2009/0282125 A1 | 11/2009 | Jeide et al. |
| 2010/0173712 A1 | 7/2010 | Buhr |
| 2010/0235511 A1 | 9/2010 | Kai |
| 2010/0257403 A1 | 10/2010 | Virk et al. |
| 2010/0332401 A1 | 12/2010 | Prahlad et al. |
| 2011/0076941 A1 | 3/2011 | Taveau et al. |
| 2011/0078319 A1 | 3/2011 | Ishida |
| 2011/0093567 A1 | 4/2011 | Jeon et al. |
| 2011/0106755 A1 | 5/2011 | Hao et al. |
| 2011/0126168 A1 | 5/2011 | Ilyayev |
| 2011/0219105 A1 | 9/2011 | Kryze et al. |
| 2011/0252071 A1 | 10/2011 | Cidon |
| 2011/0275316 A1 | 11/2011 | Suumaki et al. |
| 2011/0286026 A1 | 11/2011 | Matsuzawa |
| 2011/0313922 A1 | 12/2011 | Ben Ayed |
| 2012/0017236 A1 | 1/2012 | Stafford et al. |
| 2012/0023250 A1 | 1/2012 | Chen et al. |
| 2012/0028714 A1 | 2/2012 | Gagner et al. |
| 2012/0036218 A1 | 2/2012 | Oh et al. |
| 2012/0036239 A1 | 2/2012 | Donaghey et al. |
| 2012/0079095 A1 | 3/2012 | Evans et al. |
| 2012/0079126 A1 | 3/2012 | Evans et al. |
| 2012/0084803 A1 | 4/2012 | Johansson et al. |
| 2012/0110568 A1 | 5/2012 | Abel et al. |
| 2012/0128172 A1 | 5/2012 | Alden |
| 2012/0149309 A1 | 6/2012 | Hubner et al. |
| 2012/0171951 A1 | 7/2012 | Hooft |
| 2012/0203932 A1 | 8/2012 | da Costa et al. |
| 2012/0210343 A1 | 8/2012 | McCoy et al. |
| 2012/0303778 A1 | 11/2012 | Ahiska et al. |
| 2012/0311820 A1 | 12/2012 | Chang |
| 2013/0007203 A1 | 1/2013 | Szu |
| 2013/0008611 A1 | 1/2013 | Marcus et al. |
| 2013/0044106 A1 | 2/2013 | Shuster et al. |
| 2013/0045795 A1 | 2/2013 | Fiedler |
| 2013/0086114 A1 | 4/2013 | Wilson et al. |
| 2013/0117806 A1 | 5/2013 | Parthasarathy et al. |
| 2013/0159890 A1 | 6/2013 | Rossi |
| 2013/0219381 A1 * | 8/2013 | Lovitt ........................... 717/173 |
| 2013/0223240 A1 | 8/2013 | Hayes et al. |
| 2013/0225087 A1 | 8/2013 | Uhm |
| 2013/0304898 A1 | 11/2013 | Aggarwal et al. |
| 2014/0040239 A1 | 2/2014 | Hirsch |
| 2014/0053054 A1 | 2/2014 | Shen et al. |
| 2014/0101300 A1 | 4/2014 | Rosensweig et al. |
| 2014/0170978 A1 | 6/2014 | Wolman et al. |
| 2014/0215030 A1 | 7/2014 | Terwilliger et al. |
| 2014/0379853 A1 | 12/2014 | Shelton |

OTHER PUBLICATIONS

Final Office Action mailed Nov. 6, 2014, U.S. Appl. No. 14/158,682 by Quan, J., et al., filed Jan. 17, 2004.

International Search Report mailed Sep. 11, 2014, 7 pps., for International Application No. PCT/2013/031488 filed Mar. 21, 2014.

Layton, J.B., "User Space File Systems," Linux Magazine, accessed at http://www.linux-mag.com/id/7814, Jun. 22, 2010, pp. 1-4.

Non Final Office Action mailed Nov. 3, 2014, for U.S. Appl. No. 13/772,163 by Quan, J., filed Feb. 20, 2013.

Non Final Office Action mailed Oct. 23, 2014, for U.S. Appl. No. 14/252,674 by Chan, M.A., et al., filed Apr. 14, 2014.

Non-Final Office Action mailed Aug. 26, 2014, for U.S. Appl. No. 14/267,823 by Chan, M.A., et al., filed May 1, 2014.

Notice of Allowance mailed Aug. 12, 2014, U.S. Appl. No. 14/179,709 by Quan, J., et al., filed Feb. 13, 2014.

Notice of Allowance mailed Sep. 3, 2014, U.S. Appl. No. 14/160,444 by Quan, J., et al., filed Jan. 21, 2014.

Restriction Requirement mailed Aug. 29, 2014, for U.S. Appl. No. 14/252,674 by Chan, M.A., et al., filed Apr. 14, 2014.

U.S. Appl. No. 14/479,087 by Chan, M.A et al., filed Sep. 5, 2014.

U.S. Appl. No. 14/479,140 by Chan, M.A et al., filed Sep. 5, 2014.

Non-Final Office Action mailed May 8, 2014, U.S. Appl. No. 14/179,744 by Quan, J., et al., filed Feb. 13, 2014.

Non-Final Office Action mailed May 9, 2014, U.S. Appl. No. 14/160,444 by Quan, J., et al., filed Jan. 21, 2014.

Notice of Allowance mailed May 14, 2014, Co-pending U.S. Appl. No. 14/158,715, by Quan et al., filed Jan. 17, 2014.

Notice of Allowance mailed May 20, 2014, Co-pending U.S. Appl. No. 14/173,680, by Quan et al., filed Feb. 5, 2014.

McCormick, Z. and Schmidt, D. C., "Data Synchronization Patterns in Mobile Application Design," Vanderbilt University, pp. 1-14 (2012).

Notice of Allowance mailed Oct. 29, 2014, for U.S. Appl. No. 14/167,939 by Quan, J., et al., filed Jan. 29, 2014.

Notice of Allowance mailed Oct. 29, 2014, for U.S. Appl. No. 14/179,744 by Quan, J., et al., filed Feb. 13, 2014.

Notice of Allowance mailed Nov. 25, 2014, for U.S. Appl. No. 14/252,674 by Chan, M.A., et al., filed Apr. 14, 2014.

Non Final Office Action mailed Dec. 3, 2014, for U.S. Appl. No. 14/251,463 by Quan, J., et al., filed Apr. 11, 2014.

Notice of Allowance mailed Dec. 4, 2014, for U.S. Appl. No. 14/479,140 by Chan, M.A., et al., filed Sep. 5, 2014.

Notice of Allowance mailed Dec. 12, 2014, for U.S. Appl. No. 14/479,140 by Chan, M.A., et al., filed Sep. 5, 2014.

Notice of Allowance mailed Dec. 17, 2014, for U.S. Appl. No. 14/267,823 by Chan, M.A., et al., filed May 1, 2014.

Notice of Allowance mailed Dec. 19, 2014, for U.S. Appl. No. 14/479,140 by Chan, M.A., et al., filed Sep. 5, 2014.

Notice of Allowance mailed Dec. 22, 2014, for U.S. Appl. No. 14/179,744 by Quan, J., et al., filed Feb. 13, 2014.

Final Office Action mailed Dec. 23, 2014, for U.S. Appl. No. 14/158,733 by Quan, J., et al., filed Jan. 17, 2014.

Notice of Allowance mailed on Mar. 17, 2015, for U.S. Appl. No. 14/158,733, Quan, J., et al., filed Jan. 17, 2014.

Notice of Allowance mailed on Mar. 30, 2015, for U.S. Appl. No. 13/772,163, Quan, J., filed Feb. 20, 2013.

Notice of Allowance mailed on Mar. 30, 2015, for U.S. Appl. No. 14/267,823, Chan, M.A., et al., filed May 1, 2014.

Non-Final Office Action mailed on Apr. 8, 2015, for U.S. Appl. No. 13/865,515, Quan, J., et al., filed Apr. 18, 2013.

Non-Final Office Action mailed Apr. 8, 2015, for U.S. Appl. No. 14/228,190, Quan, J., et al., filed Mar. 27, 2014.

(56) References Cited

OTHER PUBLICATIONS

Notice of Allowance mailed on Apr. 15, 2015, for U.S. Appl. No. 14/479,140, Chan, M.A., et al., filed Sep. 5, 2014.
Co-Pending U.S. Appl. No. 14/042,567 by Chan, M.A., et al., filed Sep. 30, 2013.
Co-Pending Design U.S. Appl. No. 29/486,424 by Chan, M.A., et al., filed Mar. 28, 2014.
Co-Pending U.S. Appl. No. 13/772,163 by Quan, J., filed Feb. 20, 2013.
Co-Pending U.S. Appl. No. 13/865,515 by Quan, J., et al., filed Apr. 18, 2013.
Co-Pending U.S. Appl. No. 14/042,509 by Chan, M.A., et al., filed Sep. 30, 2013.
Co-Pending U.S. Appl. No. 14/043,034 by Chan, M.A., et al., filed Oct. 1, 2013.
Co-Pending U.S. Appl. No. 14/158,682 by Quan, J., et al., filed Jan. 17, 2004.
Co-Pending U.S. Appl. No. 14/158,715 by Quan, J., et al., filed Jan. 17, 2014.
Co-Pending U.S. Appl. No. 14/158,733 by Quan, J., et al., filed Jan. 17, 2014.
Co-Pending U.S. Appl. No. 14/160,444 by Quan, J., et al., filed Jan. 21, 2014.
Co-Pending U.S. Appl. No. 14/167,834 by Quan, J., et al., filed Jan. 29, 2014.
Co-Pending U.S. Appl. No. 14/167,939 by Quan, J., et al., filed Jan. 29, 2014.
Co-Pending U.S. Appl. No. 14/173,680 by Quan, J., et al., filed Feb. 5, 2014.
Co-Pending U.S. Appl. No. 14/179,709 by Quan, J., et al., filed Feb. 13, 2014.
Co-Pending U.S. Appl. No. 14/179,744 by Quan, J., et al., filed Feb. 13, 2014.
Co-Pending U.S. Appl. No. 14/221,174 by Chan, M.A., et al., filed Mar. 20, 2014.
Co-Pending U.S. Appl. No. 14/228,190 by Quan, J., et al., filed Mar. 27, 2014.
Co-Pending U.S. Appl. No. 14/251,463 by Quan, J., et al., filed Apr. 11, 2014.
Co-Pending U.S. Appl. No. 14/252,674 by Chan, M.A., et al., filed Apr. 14, 2014.
Co-Pending U.S. Appl. No. 14/267,823 by Chan, M.A., et al., filed May 1, 2014.
International Search Report and Written Opinion mailed Feb. 3, 2014, 7 pp., for International Application No. PCT/2013/62737 filed Sep. 30, 2013.
International Search Report and Written Opinion mailed Feb. 3, 2014, 7 pp., for International Application No. PCT/US13/62729 filed Sep. 30, 2013.
International Search Report and Written Opinion mailed Feb. 3, 2014, 9 pp., for International Application No. PCT/US13/62986 filed Oct. 2, 2013.
Non-Final Office Action mailed Apr. 2, 2014, U.S. Appl. No. 14/179,709 by Quan, J., et al., filed Feb. 13, 2014.
Non-Final Office Action mailed Apr. 3, 2014, U.S. Appl. No. 14/158,682 by Quan, J., et al., filed Jan. 17, 2004.
Non-Final Office Action mailed Mar. 10, 2014, Co-pending U.S. Appl. No. 14/173,680, by Quan et al., filed Feb. 5, 2014.
Non-Final Office Action mailed Mar. 7, 2014, Co-pending U.S. Appl. No. 14/158,715, by Quan et al., filed Jan. 17, 2014.
Notice of Allowance mailed Apr. 15, 2014, Co-pending U.S. Appl. No. 14/167,834, by Quan et al., filed Jan. 29, 2014.
Non-Final Office Action mailed May 27, 2014, U.S. Appl. No. 14/158,733 by Quan, J., et al., filed Jan. 17, 2014.
Non-Final Office Action mailed Jun. 9, 2014, for U.S. Appl. No. 14/167,939 by Quan, J., et al., filed Jan. 29, 2014.
Restriction Requirement mailed Jun. 12, 2014, for U.S. Appl. No. 14/251,463 by Quan, J., et al., filed Apr. 11, 2014.
Non-Final Office Action mailed Jun. 22, 2015, for U.S. Appl. No. 14/043,034, of Quan, J., et al., filed Oct. 1, 2013.
Non-Final Office Action mailed Jun. 22, 2015, for U.S. Appl. No. 14/158,682, of Quan, J., et al., filed Jan. 17, 2014.
Non-Final Office Action mailed Jul. 20, 2015, for U.S. Appl. No. 14/042,509, of Chan, M.A., et al., filed Sep. 30, 2013.
Notice of Allowance mailed Jul. 24, 2015, for U.S. Appl. No. 14/158,733, of Quan, J., et al., filed Jan. 17, 2014.
Non-Final Office Action mailed Aug. 21, 2015, for U.S. Appl. No. 14/042,567, of Chan, M.A., et al., filed Sep. 30, 2013.
Final Office Action mailed Sep. 9, 2015, for U.S. Appl. No. 14/251,463, of Quan, J., et al., filed Apr. 11, 2014.
Notice of Allowance mailed Oct. 2, 2015, for U.S. Appl. No. 14/228,190 of Quan, J., et al., filed Mar. 27, 2014.
Notice of Allowance mailed Oct. 7, 2015, for U.S. Appl. No. 13/865,515, of Quan, J., et al., filed Apr. 18, 2013.
U.S. Appl. No. 14/804,696, of Quan, J., et al., filed Jul. 21, 2015.
U.S. Appl. No. 14/835,981, of Chu, B., et al., filed Aug. 26, 2015.
U.S. Appl. No. 14/836,032, of Quan, J., et al., filed Aug. 26, 2015.
U.S. Appl. No. 14/840,611, of Chan, M.A., et al., filed Aug. 31, 2015.
U.S. Appl. No. 14/840,636, of Chan, M.A., et al., filed Aug. 31, 2015.

* cited by examiner

| Device ID | Rank |
|---|---|
| Device 310 | 1 |
| Device 320 | 2 |
| | |
| | |
| | |

*FIG. 5A*

| Device ID | Rank |
|---|---|
| Device 310 | 1 |
| Device 330 | 2 |
| Device 320 | 3 |
| | |
| | |

*FIG. 5B*

INTERFACE FOR RESOLVING SYNCHRONIZATION CONFLICTS OF APPLICATION STATES

PRIORITY CLAIM

This application claims to the benefit of U.S. Provisional Patent Application No. 61/708,794, entitled "CLOUD COMPUTING INTEGRATED OPERATING SYSTEM", which was filed on Oct. 2, 2012, which is incorporated by reference herein in its entirety.

This application also claims to the benefit of U.S. Provisional Patent Application No. 61/804,134, entitled "OPERATING SYSTEM AND DEVICE INTEGRATED WITH CLOUD COMPUTING FUNCTIONALITIES", which was filed on Mar. 21, 2013, which is incorporated by reference herein in its entirety.

This application is related to U.S. patent application Ser. No. 13/772,163, entitled "APPLICATION STATE SYNCHRONIZATION ACROSS MULTIPLE DEVICES", which was filed on Feb. 20, 2013, which is incorporated by reference herein in its entirety.

FIELD OF THE INVENTION

At least one embodiment of the present invention pertains to mobile devices, and more particularly, to resolving synchronization conflicts for mobile devices.

BACKGROUND

Data synchronization is a process of establishing consistency among data from a source device to a target data storage and vice versa. The data synchronization process maintains a continuous harmonization of the data among the source device and the target storage over time. The process can be utilized in a variety of applications, including file synchronization and mobile device synchronization.

For instance, cloud storage is used for data synchronization for computing devices such as mobile devices. A cloud storage can be a networked storage where data is stored not only in the user's computer, but in virtualized pools of storage which are generally hosted by remote servers or clusters. The mobile devices may synchronize data (e.g. files) via the cloud storage.

The data or file synchronization among the devices can be either one-way or two-way. In one-way synchronization (also referred to as mirroring), updated files or data are copied from a source location to one or more target locations (e.g. locations on a separate device), but no files or data are copied back to the source location. In two-way file synchronization, updated files or data are copied in both directions, usually with the purpose of keeping the two locations identical to each other. The term synchronization generally refers to two-way synchronization in this application.

There may be conflicts detected during the synchronization. Conflicts are situations where a file or a data set has been modified on both sources with different content, as opposed to where it has only been modified on one. Undetected conflicts can lead to overwriting copies of the file with the most recent version, causing data loss. For conflict detection, the synchronization process generally needs to keep a database of the synchronized files.

Cloud storage services, e.g. Dropbox or Google Drive, change the file names to avoid conflicts. For instance, if two user accounts change the same file at the same time, when the cloud storage synchronized that file between these two user accounts, the cloud storage does not try to merge the changes directly. Instead, the cloud storage saves the original file as well as a second version which has the same name but is appended with additional characters (e.g. "conflicted copy"). The cloud storage may further change the file name with the name of the user account or computer responsible for the change, and the date the conflict occurred.

However, by preserving two conflicted files with different file names, a user needs to manually decide which file among the conflicted files is the version he intended to maintain or use. By preserving the conflicted files, the cloud storage ensures the intended version not to be overwritten; such a solution requires the user to make the judgment later for each occasion of synchronization conflict.

SUMMARY

Technology introduced here provides a mechanism to resolve synchronization conflicts when computing devices synchronize application state data between each other. According to at least one embodiment, a computing device presents a user interface to prompt a user to choose between different versions of application state data for the same application running on different computing devices.

For instance, when a user starts an application on a smart phone, the smart phone may detect a set of application state data stored in the smart phone. The application state data represents an application state of the application. The smart phone can communicate with a cloud storage server and be notified that a tablet of the same user stores a different set of application state data. The smart phone can present a user interface prompting the user to choose between the two sets of application state data along with the device types (smart phone and tablet), times and dates in which the two sets of application state data were generated. If the user chooses the other set of application state data from the tablet, the smart phone can request that set from the cloud storage server and use that set, instead of the set locally stored, to restore the application to a previous application state.

The application state data contains information to specify a running status of the application. A operating system can use the application state data to restore the application to the status specified by the application state data. The application herein does not need to contain any code for organization, monitoring, or synchronization of the application state data. The application state data are organized, monitored and synchronized by the operating system, instead of the application.

In accordance with the techniques introduced here, therefore, a computer-implemented method for resolving synchronization conflicts is provided. The method sends, from a first computing device to a server, a signal indicating that a first set of application state data has been generated. The first set of application state data represents an application state of a computer application running at the first computing device. The first computing device then receives from the server a message indicating that a second set of application state data for the computer application has been generated at a second computing device. The second set of application state data conflicts with the first set of application state data. The first computing device further presents a user interface prompting a user to choose a preferred set of application state data between the first and second sets of application state data. If the user chooses the second set of application state data as the preferred set, the first computing device requests from the server the second set of application state data to overwrite the first set of application state data at the first computing device.

In accordance with the techniques introduced here, therefore, another computer-implemented method for resolving synchronization conflicts is provided. The method detects, at a server, a first set of application state data at a first computing device conflicting with a second set of application state data at a second computing device. The first set of application state data represents an application state of a computer application running at the first computing device, and the second set of application state data represents another application state of the computer application running at the second computing device. The server then receives from the first computing device a signal indicating that a user has chosen the second set as a preferred set of application state data via a user interface generated by the first computing device. The server further transfers, to the first computing device, the second set of application state data to overwrite the first set of application state data at the first computing device.

Other aspects of the technology introduced here will be apparent from the accompanying figures and from the detailed description which follows.

BRIEF DESCRIPTION OF THE DRAWINGS

These and other objects, features and characteristics of the present invention will become more apparent to those skilled in the art from a study of the following detailed description in conjunction with the appended claims and drawings, all of which form a part of this specification. In the drawings:

FIG. 5A illustrates an example of a ranking list.

FIG. 5B illustrates another example of a ranking list.

DETAILED DESCRIPTION

References in this specification to "an embodiment," "one embodiment," or the like, mean that the particular feature, structure, or characteristic being described is included in at least one embodiment of the present invention. Occurrences of such phrases in this specification do not all necessarily refer to the same embodiment, however.

Figure 1:
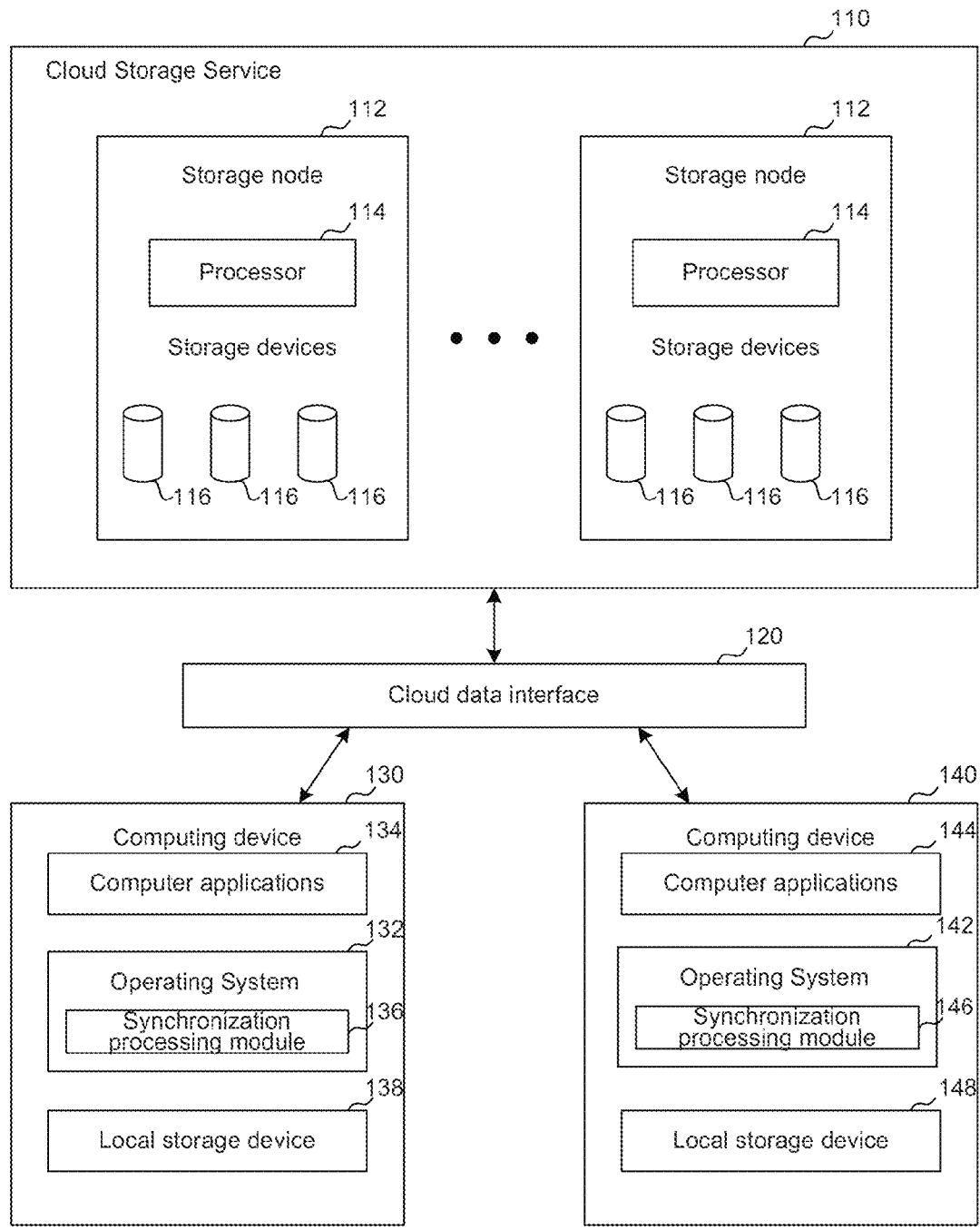
FIG. 1 illustrates an example system for data synchronization between computing devices.

FIG. 1 illustrates an example system for data synchronization between computing devices. The system includes a cloud storage service 110 configured to store synchronized data and determine synchronization conflicts. In one embodiment, the cloud storage service 110 can be a storage cluster having computer nodes interconnected with each other by a network. The storage cluster can communicate with other computing devices via the Internet. The cloud storage service 110 contains storage nodes 112. Each of the storage nodes 112 contains one or more processors 114 and storage devices 116. The storage devices can include optical disk storage, RAM, ROM, EEPROM, flash memory, phase change memory, magnetic cassettes, magnetic tapes, magnetic disk storage or any other computer storage medium which can be used to store the desired information.

A cloud data interface 120 can also be included to receive data from and send data to computing devices. The cloud data interface 120 can include network communication hardware and network connection logic to receive the information from computing devices. The network can be a local area network (LAN), wide area network (WAN) or the Internet. The cloud data interface 120 may include a queuing mechanism to organize data update received from or sent to the computing devices 130 and 140.

The computing devices 130 and 140 can synchronize the data stored in the devices 130 and 140 via the cloud storage service 110. The cloud storage service 110 can maintain a current copy of the synchronized data in the cloud storage service 110. When a computing device 130 or 140 plans to commit an update to the data, the device 130 or 140 sends the update to the cloud storage service 110. The cloud storage service 110 determines the current update if there are multiple conflicting updates to the data received from the computing devices 130 and 140. The cloud storage service 100 further distributes the determined current updates to the computing devices 130 and 140 so that all computing devices maintain a consistent copy of the synchronized data. The computing devices 130 and 140 do not need to communicate with each other directly. The cloud storage service 100 is responsible for communicating with each computing device for the data synchronization.

Alternatively, the conflict can be detected by a computing device. For instance, initially the computing devices 130 and 140 both maintains a version 9 of the data. The cloud storage service 110 stores a version 9 of the data as well. The computing device 130 generates a version 10A of the data to replace the version 9 of the data. In the meanwhile, the computing device 140 generates a different version 10B of the data to replace the version 9 of the data. The computing device 130 synchronizes with the cloud storage service 110 with the version 10A of the data. The cloud storage service 110 in turn tries to push the version 10A of the data to computing device 140. The computing device detects the conflicts between the version 10A and the version 10B of the data. The computing device prompts the user to make decision regarding the conflict.

Although FIG. 1 illustrates two computing devices 130 and 140, a person having ordinary skill in the art will readily understand that the technology disclosed herein can be applied to data synchronization among more than two computing devices.

A computing device 130 includes an operating system 132 to manage the hardware resources of the computing device 130 and provides services for running computer applications 134. The computer applications 134 stored in the computing device 130 require the operating system 132 to properly run on the device 130. The computing device 130 can send backup and updates of the data of the computer applications 134 to the cloud storage service 110. The computing device 130 includes at least one local storage device 138 to store the computer applications and user data. The computing device 130 or 140 can be a desktop computer, a laptop computer, a tablet computer, an automobile computer, a game console, a smart phone, a personal digital assistant, or other computing devices capable of running computer applications, as contemplated by a person having ordinary skill in the art.

The computer applications 134 stored in the computing device 130 can include applications for general productivity and information retrieval, including email, calendar, contacts, and stock market and weather information. The computer applications 134 can also include applications in other categories, such as mobile games, factory automation, GPS and location-based services, banking, order-tracking, ticket purchases or any other categories as contemplated by a person having ordinary skill in the art.

The operating system 132 of the computing device 130 includes a synchronization processing module 136 to process data synchronization via the cloud storage server 110. Similarly, another computing device 140 can also process send and receive data synchronization via the cloud storage service 110.

Figure 2:
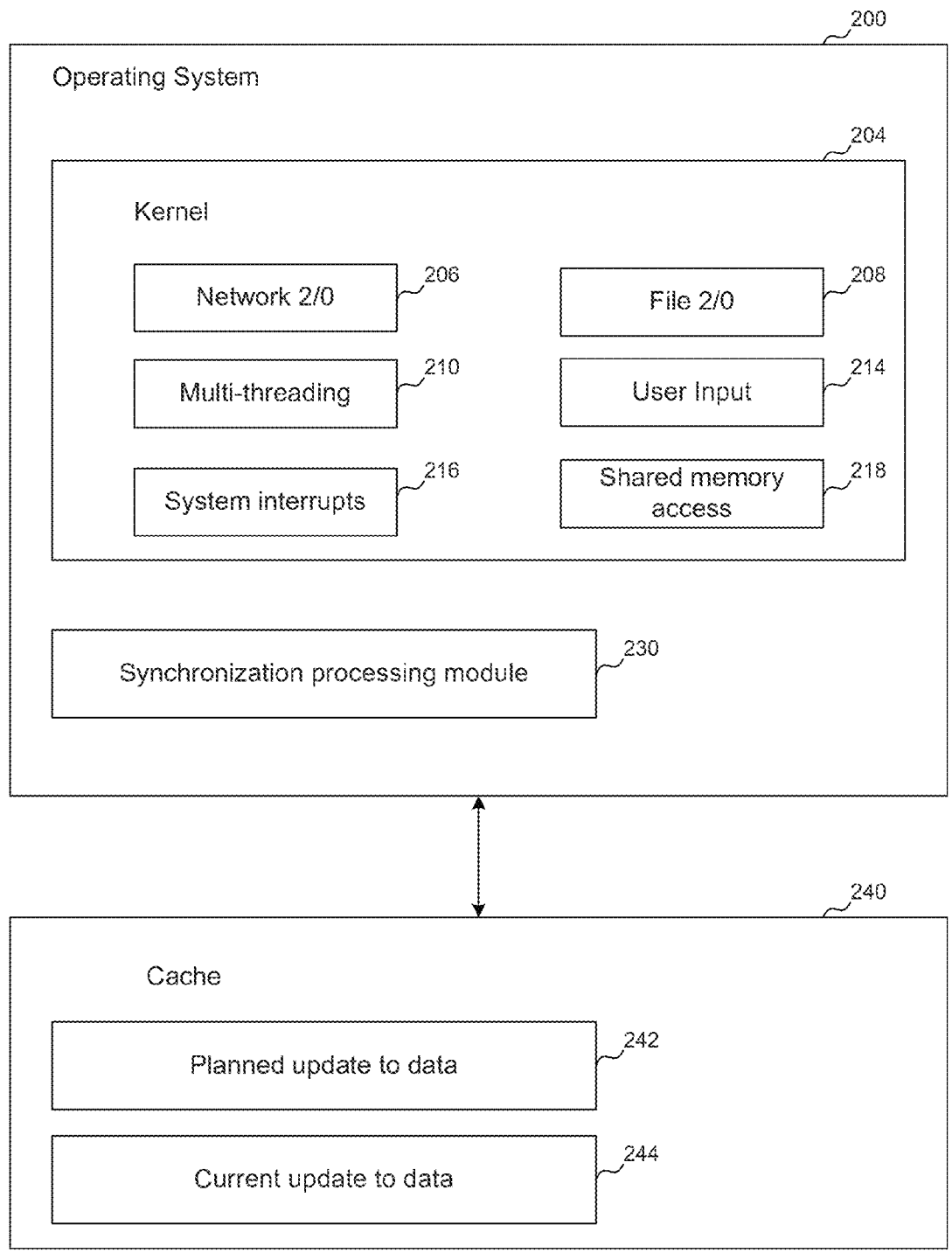
FIG. 2 illustrates an example operating system of a computing device.

FIG. 2 illustrates an example operating system of a computing device, according to one embodiment. The operating system 200 includes a kernel 204. The kernel 204 provides interfaces to hardware of the electronic device for the computer applications running on top of the kernel 204, and supervises and controls the computer applications. The kernel 204 isolates the computer applications from the hardware. The kernel 204 may include one or more intervening sources that can affect execution of a computer application. In one embodiment, the kernel 204 includes a network I/O module 206, a file I/O module 208, multi-threading module 210, user input 214, system interrupts 216, and shared memory access 218.

A synchronization processing module 230 runs on top of the kernel 204. The synchronization processing module 230 is responsible for handing the updates to the data stored in the device 200 and data synchronization with the cloud service and other computing devices. In the example of FIG. 2, a cache 240 stores a planned update to the data 242. For data synchronization purpose, the synchronization processing module 230 sends the planned update 242 to a cloud server (e.g. cloud storage service 110). The cloud storage service 100 either confirms to the computing device 200 that the planned update to the data 242 is the current update, or sends to the computing device 200 a current update to the data 244 that overrides the planned update to the data 242. Alternatively, the synchronization processing module 230 can be implemented as part of the a customized kernel 204.

In one embodiment, in order to determine the current update from the multiple conflicting updates from the computing devices, the cloud storage service can maintain a ranking list for deciding priorities of devices when there is a synchronization conflict.

Figure 3:
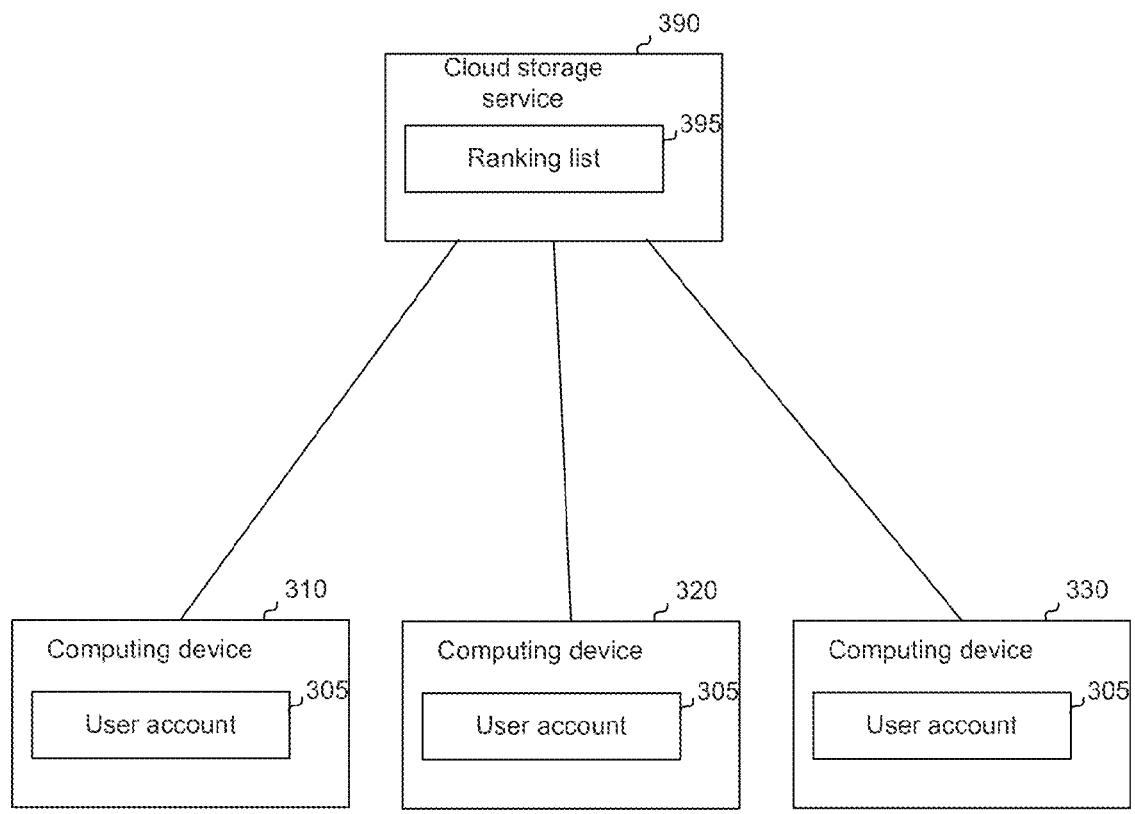
FIG. 3 illustrates an example environment for data synchronization between computing devices via a cloud storage service.

FIG. 3 illustrates an example environment for data synchronization between computing devices via a cloud storage service. For instance, a user acquires a new computing device 310 and logs into the computing device 310 using a user account 305 of the user. If the user does not have a user account for the cloud storage service 390, the computing device 310 can provide a user interface for the user to create a new user account 305 and uses the created account 305 to log into the computing device 310. When the user logs into the computing device 310, the computing device communicates with the cloud storage service 390 to check whether there are other computing devices associated with the user account 305. All computing devices associated with a single account are defined as a synchronization group. The computing devices in a synchronization group will synchronize the data among the computing devices in the synchronization group. If there are no other computing devices associated with the user account 305, the cloud storage service 390 will send a confirmation to the computing device 310 to confirm that the user account 305 can log into the computing device 310.

When the user acquires another computing device 320, similarly the user can log into the computing device 320 using the same user account 305. During the log-in process, the computing device 320 communicates with the cloud storage service 390 to check whether there are other computing devices associated with the user account 305. The cloud storage service 390 determines that both devices 310 and 320 are associated with the user account 305. To track the device priorities, the cloud storage service 390 creates and maintains a ranking list 395 for identifying priorities of the devices 310 and 32 when there is a synchronization conflicts.

The cloud storage service 390 can prompt the user to determine the priorities. For instance, the cloud storage service 390 can send an instruction to the computing device 320. In response to the instruction, the computing device 320 can present a user interface (e.g. a questionnaire, selection interface, or input boxes) to prompt the user to determine the priorities of the computing devices 310 and 320. For instance, the computing device 320 can display a user interface on a display component of the computing device 320. The computing device 320 can display the user interface at various events, e.g., device registration, device boot-up, or user adjusting settings from a settings panel of the operating system. The user can use one or more input components of the computing device 320 to determine the priorities of the devices.

Figure 4A:
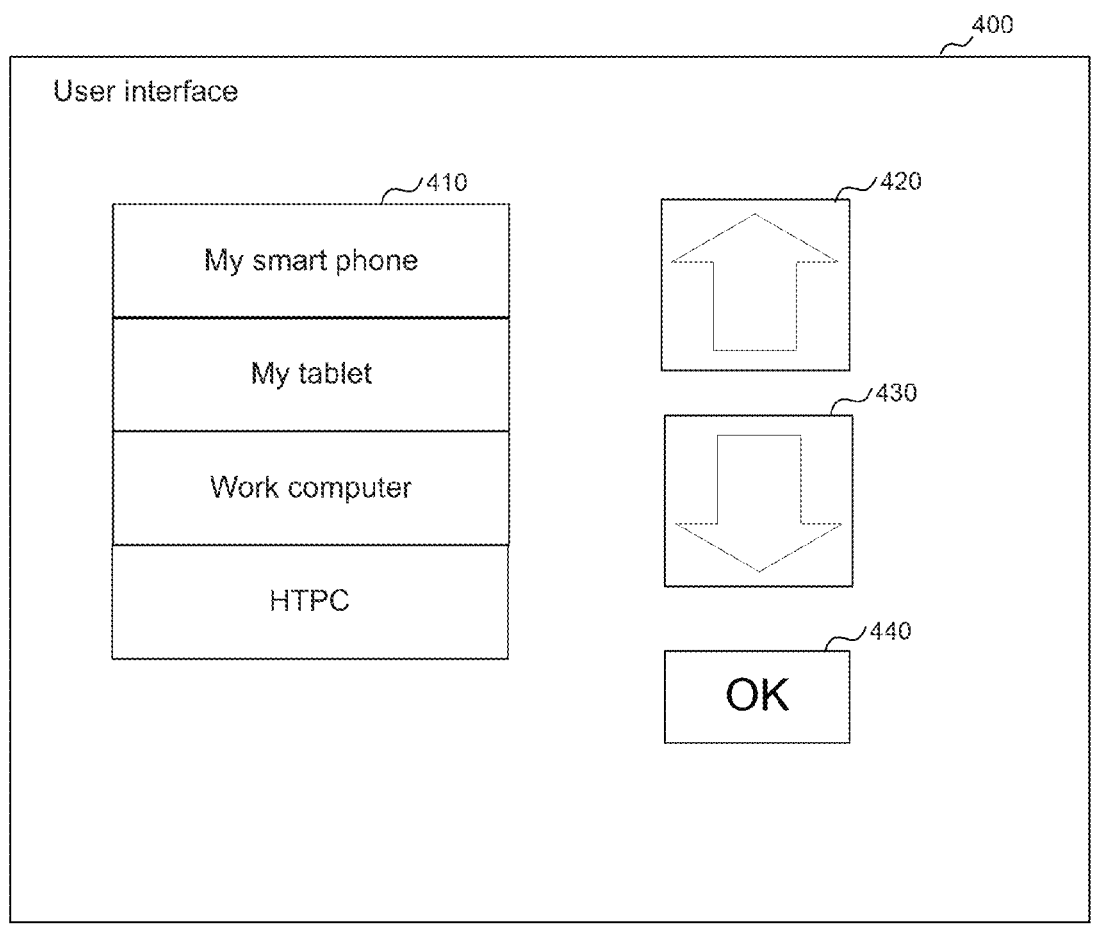
FIG. 4A illustrates an example of a user interface prompting a user to determine priorities of the devices.

FIG. 4A illustrates an example of a user interface prompting a user to determine priorities of the devices. The user interface 400 includes a list of the user devices 410 associated with a user account (e.g., user account 305). A device having a higher position in the list 410 will have a higher priority among the devices in the list 410. If any priorities of the devices in the list 410 have not yet decided yet, the user interface 400 can initially present the position of the undecided device in the list 410 in a random fashion, or present the position in a predetermined way (e.g., based on alphabetic order of the device name or time stamp when the device being associated with the user account).

The user interface 400 can further include an up arrow button 420 and a down arrow button 430. A user can select one of the devices in the list 410, and then clicks the up arrow button 420 or the down arrow button 430 to move the selected device upward or downward in the list 410. A user can select each device in the list 410 sequentially and adjust the position of each list using the buttons 420 and 430. Once the user has finished adjusting the positions of the devices in the list 410, which represents the priorities of the device in a synchronization group, the user can clicks the ok button 440 to confirm his or her decision. If the computing device 320 presents the user interface 400 and receives a signal indicative that the user clicked the ok button, the computing device 320 sends the information about the user's decision on the device priorities to the cloud storage service 390.

Figure 4B:
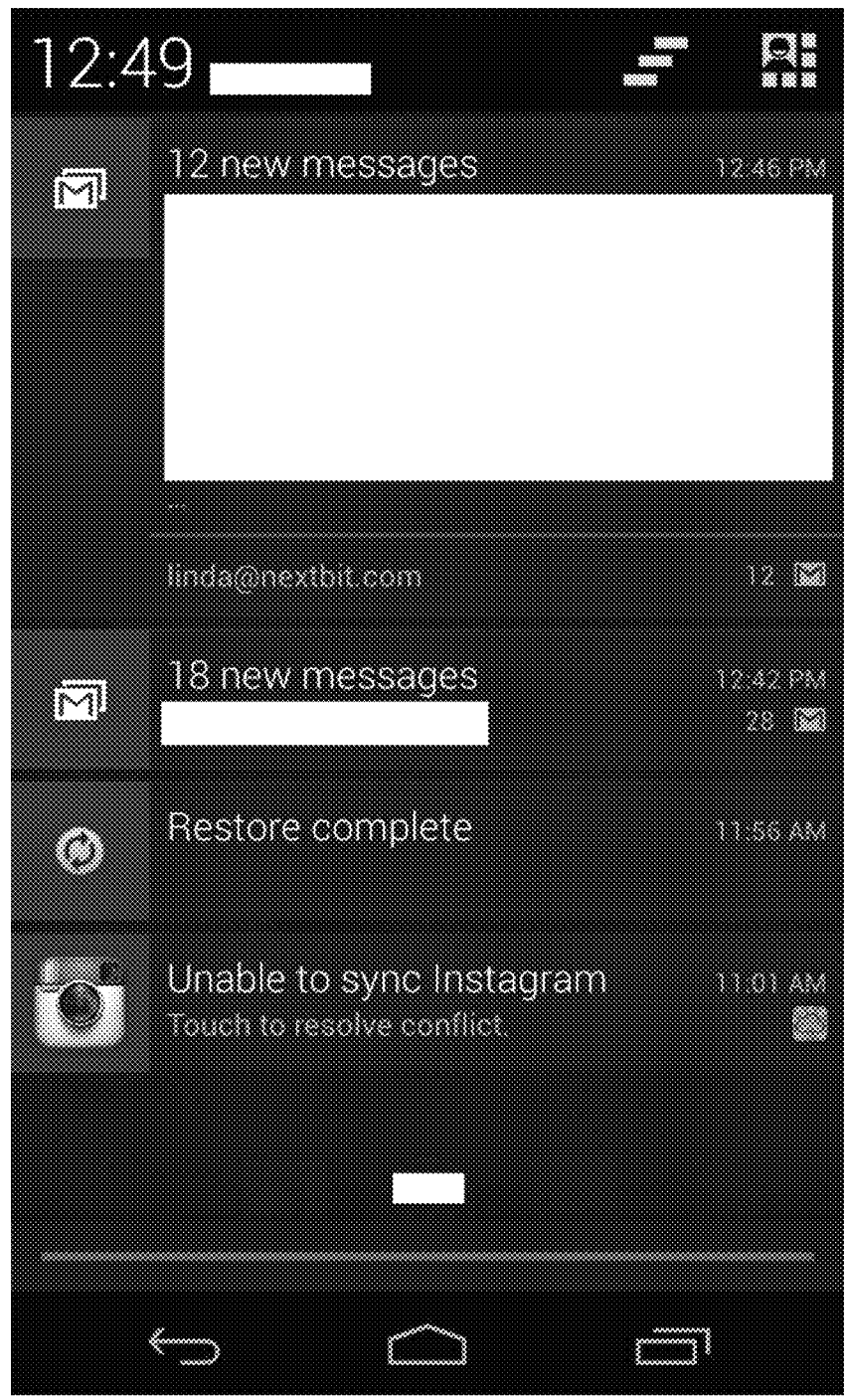
FIGS. 4B-4E illustrate another example of a series of user interfaces prompting a user to determine priorities when there is a conflict.

FIGS. 4B-4E illustrate another example of a series of user interfaces prompting a user to determine priorities when there is a conflict. FIG. 4B illustrates an interface of a message visualized on a computing device to notify the user that the device is unable to synchronize data for an application (e.g. Instagram) because there is a synchronization conflict. The user can touch the message to resolve the conflict.

Figure 4C:
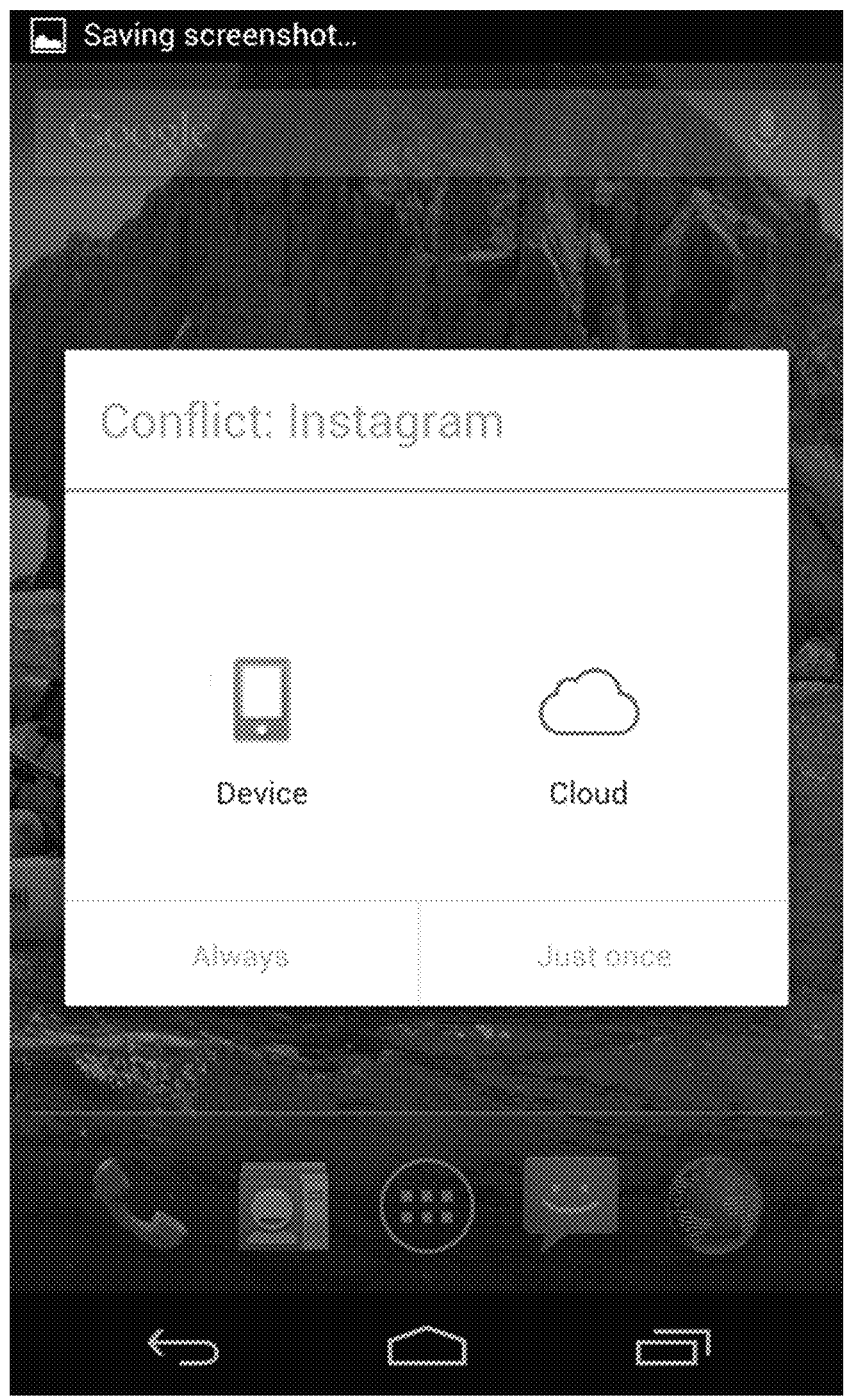
Figure 4D:
Figure 4E:

Once the user touches the message, the device visualizes an interface as illustrated in FIG. 4C. The interface in FIG. 4C includes two icons representing the device and a cloud server respectively. A user can touch one of the icons to choose which device wins the conflict. For example, as illustrated in FIG. 4D, the user can touch the icon representing the device to decide that the device wins the conflict. The user can further touch either the "Always" button or the "Just Once" button to determine whether the decision applies to future conflicts. For example, as shown in FIG. 4E, if the user touches the "Always" button, the user instructs the device to apply the decision to all future conflicts. If the user touches the "Just Once" button, the user instructs the device to apply the decision only for this conflict. The computing device then may prompt the user again when there is another conflict.

Figure 5A:
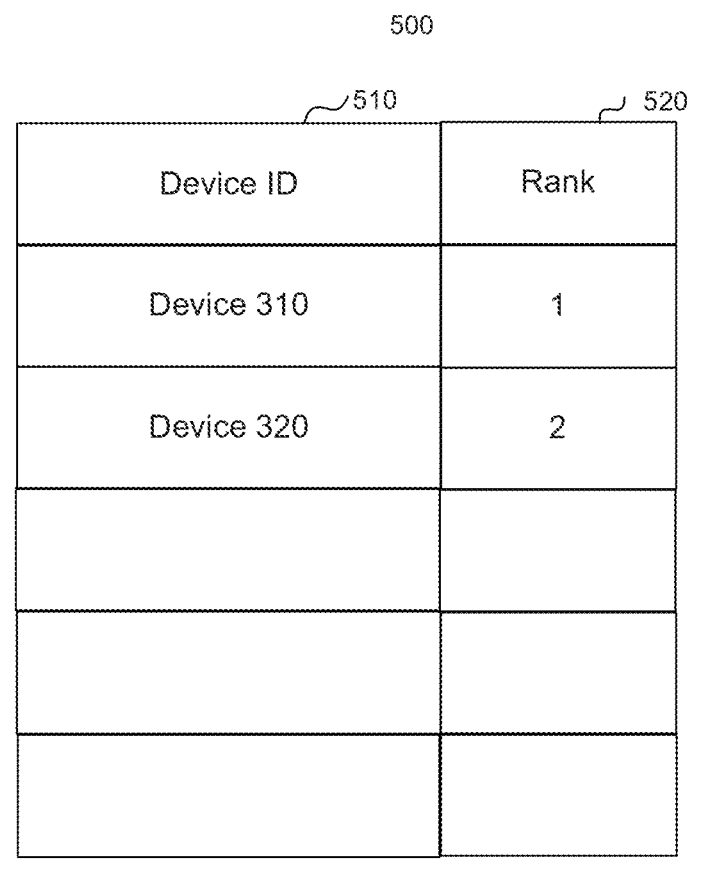

The cloud storage service 390 determines the ranking list 395 based on the received user's decision. The decision can be recognized as a rule applying to future conflicts. Alternatively, the decision can be recognized as one-time rule applying to the current conflict only. In some embodiments, the user interface can provide an option for the user to specify whether the decision should be considered as a one-time rule or a general rule applying to future conflicts. In various embodiments, the ranking list 395 can be a data structure, e.g., a database. FIG. 5A illustrates an example of a ranking list. A column 510 of the ranking list 500 stores identifications of the devices in a synchronization group. In various embodiments, the identifications of the devices can be device names, media access control address (MAC) addresses, Internet Protocol addresses (IP addresses), device serial numbers, or other types of identifications. A column 520 stores the ranks of the devices. The ranks can be represented by integers or other types of representations. In some embodiments, the smaller number represents a higher priority for the corresponding device. Some other embodiments can use other forms of representations, e.g. the larger number represents a higher priority for the corresponding device.

When the user acquires a third computing device 330, similarly the user can log into the computing device 330 using the same user account 305. During the log-in process, the computing device 330 communicates with the cloud storage service 390 to check whether there are other computing devices associated with the user account 305. The cloud storage service 390 determines that devices 310, 320 and 330 are associated with the user account 305.

The cloud storage service 390 can prompt the user again to determine the priorities since priority of the device 330 is not determined. For example, the cloud storage service 390 can send an instruction to the computing device 330 to present a user interface similar to the interface 400 to prompt the user to determine the priorities of the computing devices, including device 330. After the user inputs the decision of the priorities, the computing device 330 sends the information about the user's decision on the device priorities to the cloud storage service 390. Accordingly, the cloud storage service 390 updates the ranking list 395 such as the ranking list 520 in FIG. 5B.

In one example, the user decides through a user interface that device 330 has a priority between the devices 310 and 320. The cloud storage service 390 maintains the ranking list 520 as shown in FIG. 5B, wherein the devices 310, 320 and 330 are assigned with rank integers of 1, 3 and 2 respectively. When there is a synchronization conflict between devices 310 and 330, the cloud storage service determines that the update from device 310 will be the current update since device 310 has a higher priority than device 330 in the ranking list 500. Similarly when there is a synchronization conflict between devices 330 and 320, the cloud storage service determines that the update from device 330 will be the current update since device 330 has a higher priority than device 320 in the ranking list 500.

Figure 6:
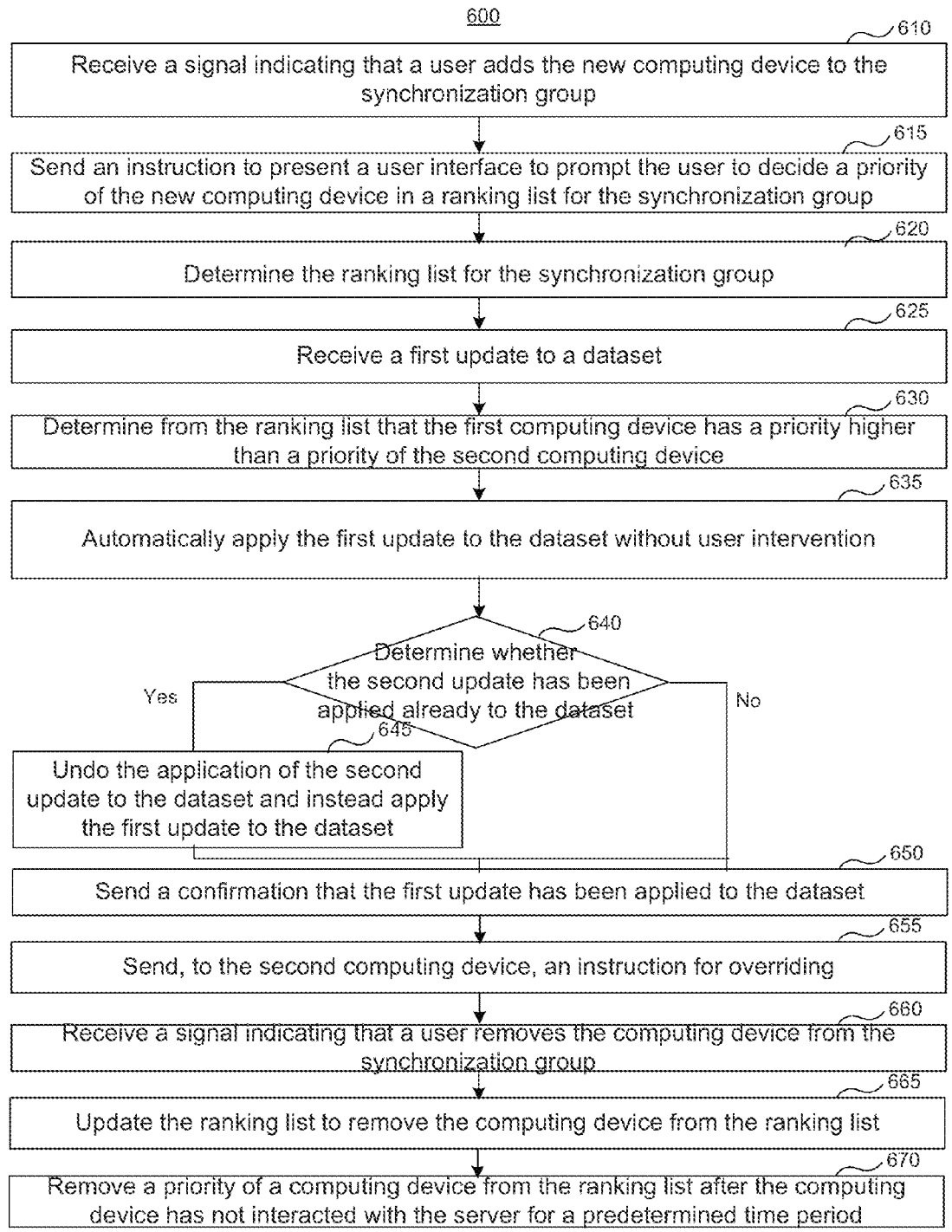
FIG. 6 illustrates an example of a process for maintaining a ranking list and resolving synchronization conflict.

The cloud storage service is responsible for maintain the ranking list and uses the ranking list to resolve synchronization conflict by determining a current update to be applied to the data. FIG. 6 illustrates an example of a process 600 for maintaining a ranking list and resolving synchronization conflict. The process 600 starts at step 610, where a cloud storage service (also referred to as server) receives, from a new computing device, a signal indicating that a user adds the new computing device to the synchronization group including one or more computing devices for the user. The synchronization group identifies the computing devices for the user that have the same view for the data set. The data set can be a file or include a plurality of files. The data set can even include all or some of user data and application data on the computing devices in the synchronization group. The signal can be generated, e.g., in response to an event of the user logging on the new computing device or an event of a user account for the user being installed in the new computing device.

There can be multiple ranking lists for the devices of the synchronization group for different synchronization purpose. For instance, there can be a ranking list for synchronization of application data for a particular application. There can be a ranking list for synchronization between particular two or more devices in the synchronization group. There can be a ranking list for synchronization for one or more particular files stored in the devices of the synchronization group.

At step 615, the server sends, to the new computing device, an instruction to present a user interface to prompt the user to decide a priority of the new computing device in a ranking list for the synchronization group. The ranking list defines an order in which a specific computing device out of the group of computing devices wins in the event of a data conflict.

The ranking list can be used with data conflicts for data with different levels of granularity. For instance, the ranking list can be used to define priorities of the computing devices of the synchronization group for applying updates to one or multiple specific data sets. Alternatively, the ranking list can be used to define priorities of the computing devices of the synchronization group for applying updates to data of an application (or multiple applications) configured to run on one or more of the computing devices of the synchronization group. Or the ranking list can be used to define priorities of the computing devices of the synchronization group for applying updates to any data stored in the computing devices of the synchronization group.

A user can decide device priorities when a new computing device is added to the synchronization group or when a synchronization group is created. For instance, the server can send, to a computing device of the synchronization group, an instruction to present a user interface to prompt the user to decide the ranking list, in response to a signal indicating that the synchronization group is created.

At step 620, the server determines the ranking list for the synchronization group based on user inputs in response to the user interface. For instance, as FIG. 5B illustrates, the server can insert a device in the middle of the ranking list based on a user instruction.

At step 625, the server receives, from a first computing device of the synchronization group, a first update to a data set. Concurrently at step 630, the server receives, from a second computing device of the synchronization group, a second update to the data set. The first and second updates are different and conflict with each other. The term "concurrently" does not necessarily mean at the exact same time point. The server can receive concurrently the second update within a time period after receiving the first update. For instance, the server can concurrently receive, from the second computing device of the synchronization group, a second update to the data set before the first update being applied to the data set.

The first and second updates to the data set can include various types of changes, e.g. a change of data in the data set, a change of metadata of the data set, a deletion of the data set, or a creation of the data set. The first update can include a different type of change from the second update. Alternatively, the first update can include the same type of change as the second update. For instance, the first update can be a change of metadata (e.g., file name or access right attribute), while the second update can be a deletion of the file.

At step 630, the server determines from the ranking list that the first computing device has a priority higher than a priority of the second computing device. At step 635, the server automatically applies the first update to the data set without user intervention since the first computing device has a higher priority than the second computing device according to the ranking list. At step 640, the server can determine whether the second update has been applied already to the data set. If the second update has been applied already to the data set, at step 645, the server undoes the application of the second update to the data set and instead applies the first update to the data set. The second update to the data set is ignored since the second computing device has a lower priority.

The server will distribute the current update to the computing devices in the synchronization group. At step 650, the server sends, to the first computing device, a confirmation that the first update has been applied to the data set. At step 655, the server sends, to the second computing device, an instruction including the first update to the data set to prompt the second computing device to override the second update with the first update applied to a local copy of the data set stored in the second computing device.

The server maintains the ranking list and updates the ranking list when there is a change to the synchronization group. At step 660, the server receives, from a computing device of the synchronization group, a signal indicating that a user removes the computing device from the synchronization group. At step 665, the server updates the ranking list for the synchronization group to remove the computing device from the ranking list. The server can further remove any device from the ranking list if a device has not been used for a time period, even that the user has not explicitly remove the device from the synchronization group. For instance, at step 670, the server removes a priority of a computing device from the ranking list after the computing device has not interacted with the server for a predetermined time period.

Those skilled in the art will appreciate that the logic illustrated in FIG. 6 and described above, and in each of the flow diagrams discussed below if any, may be altered in a variety of ways. For example, the order of the logic may be rearranged, substeps may be performed in parallel, illustrated logic may be omitted, other logic may be included, etc.

Figure 7:
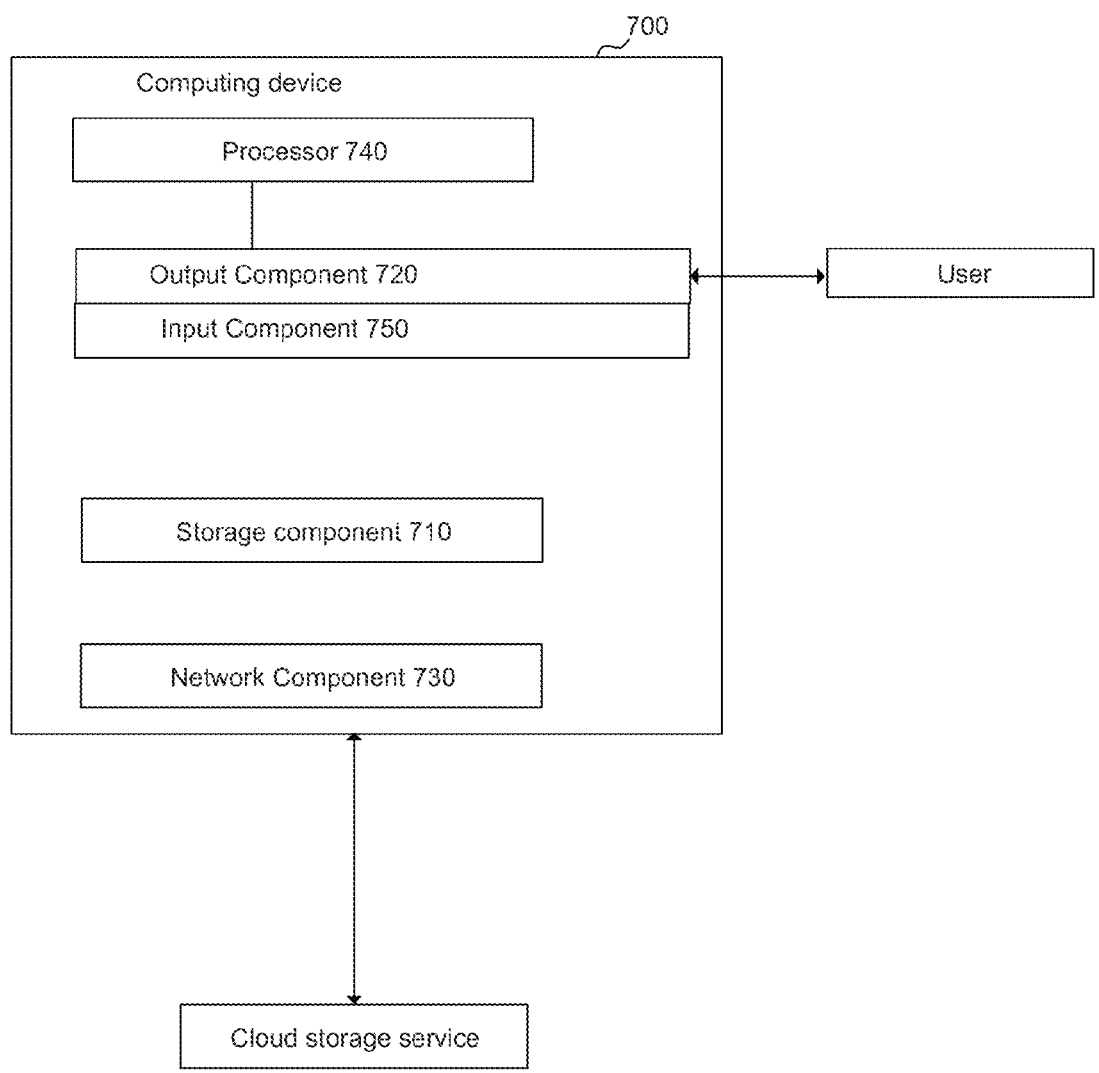
FIG. 7 illustrates an example of a computing device for data synchronization.

The computing devices in the synchronization group can be responsible for data synchronization and interacting with the user for instructions for the device priorities. FIG. 7 illustrates an example of a computing device 700 for data synchronization. The computing device 700 includes a storage component 710, an output component 720, a network component 730 and a processor 740. The storage component 710 is configured to store one or more data sets. The computing device 700 and a second computing device both store the data set. Via a cloud storage service, the computing device 700 and the second computing device can synchronize the updates to the data set.

The output component 720 is configured to present a user interface to prompt a user to decide a priority of the computing device in a ranking list for a synchronization group. The computing device 700 can further include an input component 750 configured to receive a user input in response to the prompt of the user interface for deciding the device priority. In various embodiments, the input component 750 and the output component 720 can be a single component, such as a touch screen.

Based on the user interface, a user can decide the ranking list by providing a user input (e.g., selecting an time from a list, clicking an item on the user interface, etc.), the network component 730 can send the user input to a server (e.g. a cloud storage service). The network component 730 is further configured to send a first update of the data set to the server. Concurrently, the second computing device sends a second update of the data set to the server.

The server determines which of the first and second updates the current update is by examining the priorities in the ranking list, as FIG. 6 illustrates. The computing device 700 will receive the second update via the network component 730 if the server determines the second computing device has a higher priority. The processor 740 is configured to apply the second update to the data set stored in the storage component. In other words, the processor 740 is configured to override the first update with the second update and automatically apply the second update to the data set stored in the storage component without user intervention.

Figure 8:
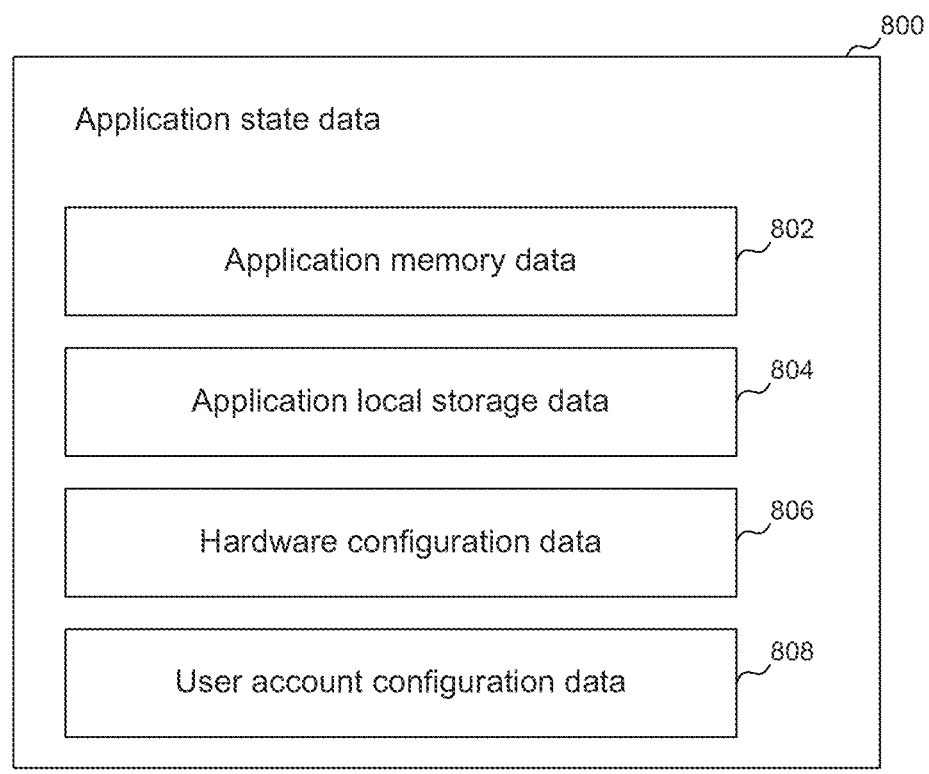
FIG. 8 illustrates an example of an application state data of a computer application collected by an operating system according to one embodiment.

The data set being synchronized can include application state data. For instance, application state data can be organized as files and synchronized between computing devices via a cloud storage service. FIG. 8 illustrates an example of an application state data of a computer application collected by an operating system according to one embodiment. In various embodiments, modules of the operating system of the computing device are responsible for organizing, monitoring, and synchronizing the application state data. Such modules can run in the computing device as background services or programs. The computer application can be developed without any code dedicated to the organization, monitoring, or synchronization of the application state data.

The application state data maintained by the operating system includes sufficient information for the operating system to restore the application running status to an application state specified by the application state data. The application herein does not need to contain any code for organization, monitoring, or synchronization of the application state data. The application state data are organized, monitored and synchronized by the operating system, instead of the application.

The application state data 800 of a computer application may include application memory data 802, application local storage data 804, hardware configuration data 806, and user account configuration data 808. In some other embodiments, the application state data can be all of or any combination of some of the fields 802, 804, 806 and 808. When the computer application is running, the state information in memory section (i.e. the application memory data 802) allocated for the application is being updated by the running application. The state synchronization module of the operating system monitors the application memory data 802, and uploads the data to a cloud storage service in response to the sync event. Furthermore, the computer application can update certain data on a local storage of the electronic device (e.g., a mobile device or a computing device). The state synchronization module of the operating system can include the application local storage data 804 in the application state data 800. In some embodiments, the electronic device includes a memory device, e.g. flash memory, as both the memory and the local storage. Therefore, the application memory data 802 and application local storage data 804 can be one section of data that exists in memory on the electronic device.

The application state data 800 may further include hardware configuration data 806. For instance, the state synchronization module may record the current device sound volume level and the screen brightness level when the application is running. The device sound volume level and the screen brightness level are recorded as part of the hardware configuration data 805 and will be uploaded to the cloud storage service. Therefore, after another device is synchronized with the application state data and starts to resume running the application, the other device automatically adjusts the sound volume level and screen brightness level as on the previous device. Moreover, the application state data 800 may include user account configuration data 808. The user account configuration data 808 may include the user's preferences and choices regarding the computer application and the operating system environment for running the computer application. For instance, the user account configuration data 808 may include information about the user's language preference. Assuming the computer application is a game supporting both English and Chinese languages for user interface in the game, the user has selected the English language as the preferred language. The state synchronization module records the user's language preference as a part of the user account configuration data 808. The user account configuration data 808 is synchronized to another device via the cloud storage service. When the other device starts to resume running the application, the application will use the English language for the game interface, as indicated by the user account configuration data 808.

Figure 9:
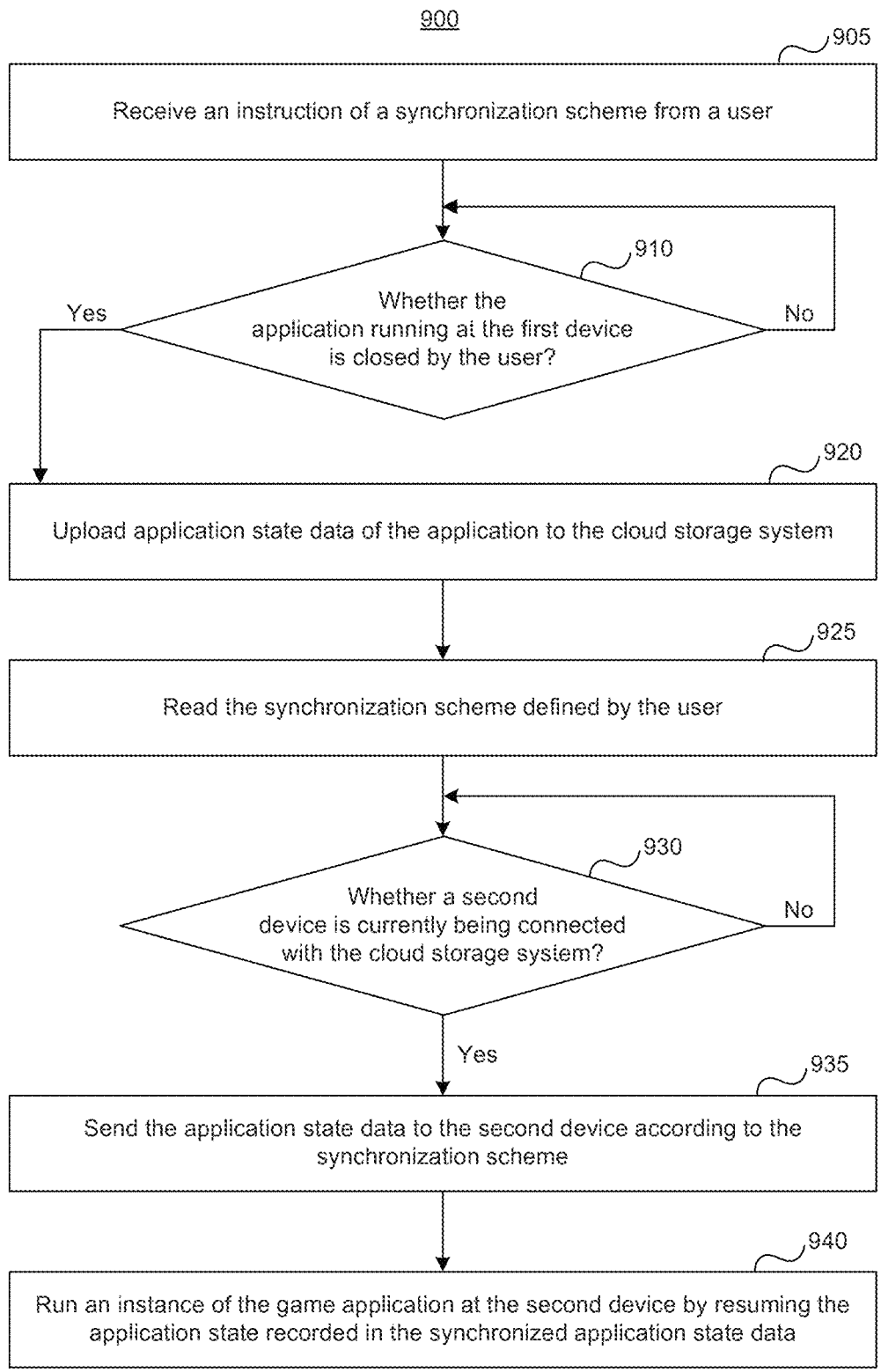
FIG. 9 illustrates an example of an application state synchronization process based on a user defined synchronization scheme.

In some embodiments, a user can define a synchronization scheme to control the way, the method and when the synchronization process performs. FIG. 9 illustrates an example of an application state synchronization process based on a user defined synchronization scheme. At step 905, a cloud storage service receives an instruction of a synchronization scheme from a user. The synchronization scheme includes rules of how and when the synchronization process performs. For example, in one embodiment, the synchronization scheme can define a synchronization rule between two electronic devices, a smart phone and a tablet computer, for application state of a game application. The synchronization rule specifies that one of the electronic devices start attempting to synchronize application state to the other device, as soon as the game application is closed or the screen of the device is turned off.

Assuming the smart phone is the current device running the game application, at step 910, the operating system of the smart phone checks whether the game application is closed by the user. If the game application is closed, the process continues to step 920. Otherwise, the process goes back to check the status as in step 910 in a predetermined time period. Alternatively, at step 910 the operating system of the smart phone can check whether other types of events occur. For instance, the operating system can check whether the screen of the smart phone is turned off.

At step 920, the smart phone uploads application state data of the game application to the cloud storage system. The schedule of the uploading can depend on a type and a speed of a connection between the smart phone and the cloud storage system. For instance the schedule can be determined so that the uploading is delayed to use a WiFi connection, to avoid the uploading using a cellular data connection (e.g. 3G or LTE). At step 925, the cloud storage system reads the synchronization scheme defined by the user. At step 930, the cloud storage system checks whether the other device, i.e. the tablet computer, is currently being connected with the cloud storage system. If the tablet computer is connected with the cloud storage system, the system sends the application state data to the tablet computer according to the synchronization scheme at 935. Otherwise, the cloud storage system continues to check the connection with the tablet computer on a periodic basis.

At step 940, when the user starts to use the tablet computer, the tablet computer starts to run an instance of the game application by resuming the application state recorded in the synchronized application state data.

Figure 10:
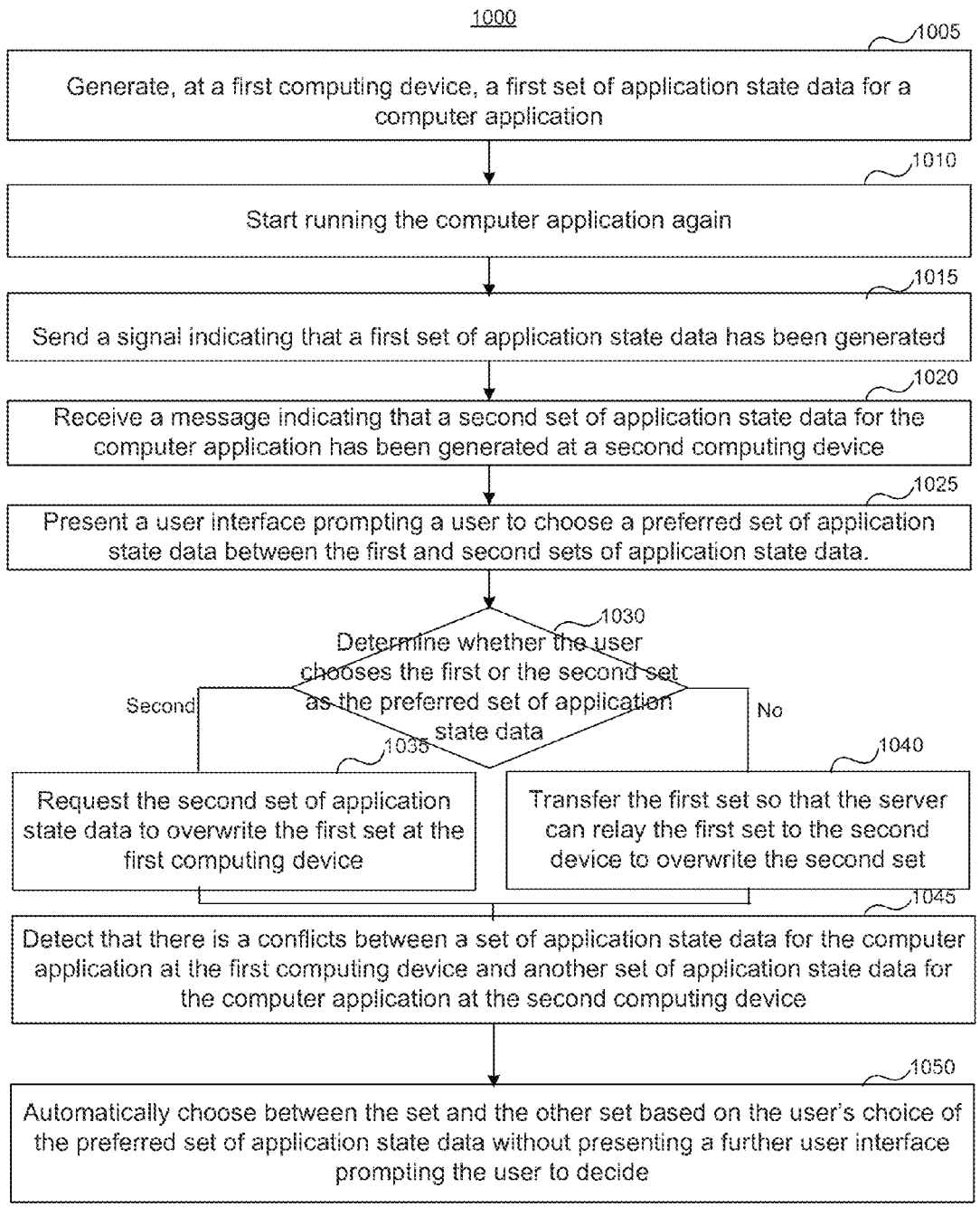
FIG. 10 illustrates an example of an application state synchronization process prompting a user for decision making.

A computing device can present user interface to prompt a user to choose a preferred set application state data. FIG. 10 illustrates an example of an application state synchronization process 1000 prompting a user to make a decision. At step 1005, the process 1000 generates, at a first computing device, a first set of application state data for a computer application. The first set of application state data represents an application state of a computer application running at the first computing device. The first set of application state data may be generated when the computer application pauses or quits running. The same computer application may have run at a second computing device and have a second set of application state data generated at the second computing device as well. At step 1010, the first computing device starts running the computer application again.

At step 1015, the first computing device sends to a server a signal indicating that a first set of application state data has been generated. At step 1020, the first computing device receives from the server a message indicating that a second set of application state data for the computer application has been generated at a second computing device. The second set of application state data conflicts with the first set of application state data. In other words, an application state represented by the first set is different from another application state represented by the second set Accordingly at step 1025, the first computing device presents a user interface prompting a user to choose a preferred set of application state data between the first and second sets of application state data. The user interface is generated by an operating system of the computing device, instead of the computer application running at the computing device. The user interface can present metadata of the first and second sets of application state data. Such metadata include identifications of the first and second computing devices, device types or models of the first and second computing devices, timestamps indicating when the first and second sets of application state data was generated, an identification of the computer application, or progress information indicative of application states represented by the first and second sets of application state data. For instance, the device types or models can be visualized at the user interface by pictures of the first and second computing devices.

The user interface can further prompt the user to decide whether the choice of the preferred set of application state data applies to future conflicts for the computer application. For instance, the user interface can include a checkbox with a text of "remember my choice." The user interface can further enable the user to specify a time period or recurring time periods for which the choice of the preferred set of application state data applies to future conflicts for the computer application. For instance, the user choice may apply to future conflicts occurring during the weekends. The user interface can as well further enable the user to specify one or more locations at which the choice of the preferred set of application state data applies to future conflicts for the computer application. For instance, the user choice may apply to future conflicts occurring when the device is at home, instead of in office. The location information may be detected by Global Positioning System (GPS), cellular phone network triangulation, WiFi networks, or other types of mobile device tracking technologies. The user interface can even include an option for the user to choose not to synchronize the application state data of the computer application between the first and second computing devices.

Once the user has decided, the first computing device synchronizes the preferred set of application state data for the computer application with the second computing device via the server based on what the user chooses between the first and second sets of application state data. At step 1030, the first computing device determines whether the user chooses the first or the second set as the preferred set of application state data.

At step 1035, if the user chooses the second set of application state data as the preferred set, the first computing device requests from the server the second set of application state data to overwrite the first set of application state data at the first computing device.

At step 1040, if the user chooses the first set of application state data as the preferred set, the first computing device can transfer to the server the first set of application state data so that the server can relay the first set to the second computing device to overwrite the second set of application state data at the second computing device.

If the user has elected to apply the choice to future conflicts, at step 1045, the first computing device may detects that there is a conflicts between a set of application state data for the computer application at the first computing device and another set of application state data for the computer application at the second computing device. Optionally at step 1050, the first computing device automatically chooses between the set and the other set based on the user's choice of the preferred set of application state data without presenting a further user interface prompting the user to decide.

Figure 11:
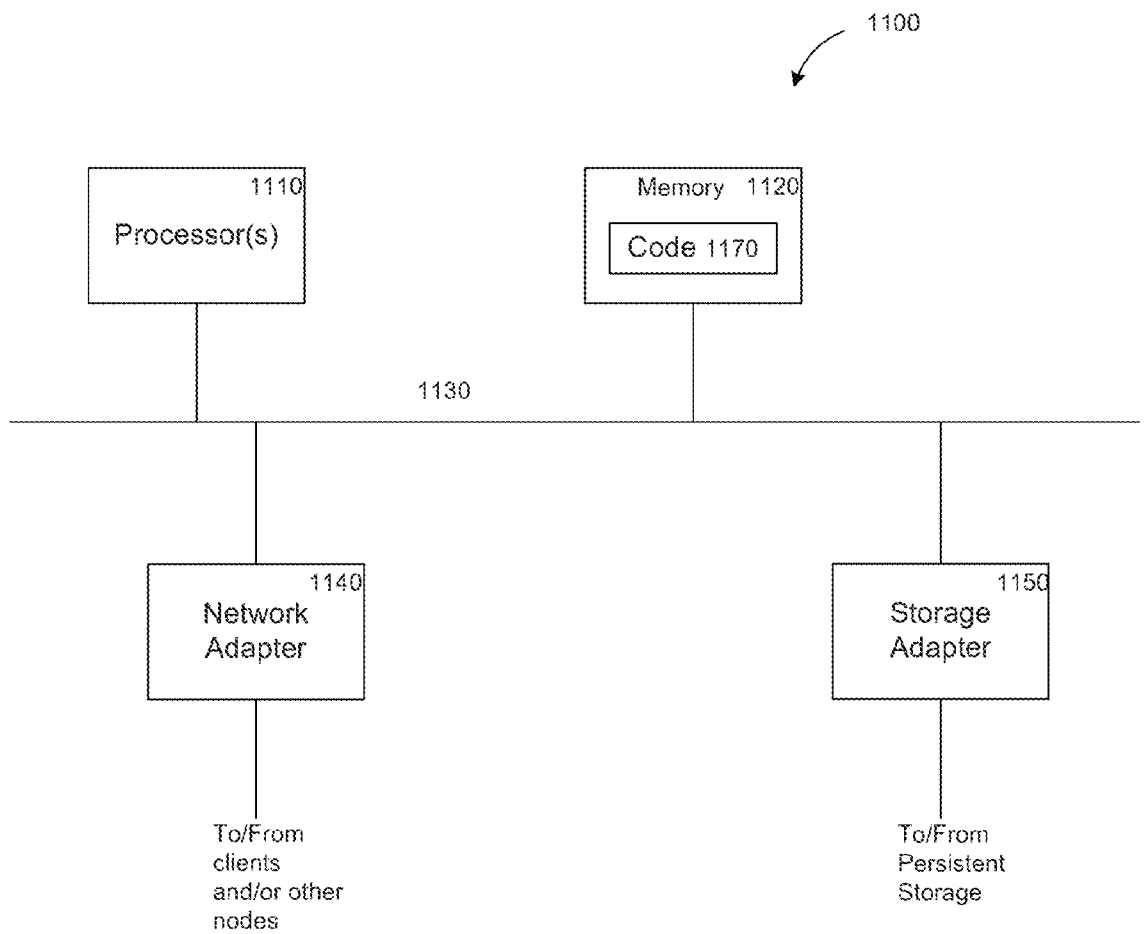
FIG. 11 is a high-level block diagram showing an example of the architecture of a computer, which may represent any computing device or server described herein.

FIG. 11 is a high-level block diagram showing an example of the architecture of a computer 1100, which may represent any computing device or server described herein. The computer 1100 includes one or more processors 1110 and memory 1120 coupled to an interconnect 1130. The interconnect 1130 shown in FIG. 11 is an abstraction that represents any one or more separate physical buses, point to point connections, or both connected by appropriate bridges, adapters, or controllers. The interconnect 1130, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 1110 is/are the central processing unit (CPU) of the computer 1100 and, thus, control the overall operation of the computer 1100. In certain embodiments, the processor(s) 1110 accomplish this by executing software or firmware stored in memory 1120. The processor(s) 1110 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 1120 is or includes the main memory of the computer 1100. The memory 1120 represents any form of random access memory (RAM), read-only memory (ROM), flash memory, or the like, or a combination of such devices. In use, the memory 1120 may contain a code 1170 containing instructions according to the technology disclosed herein.

Also connected to the processor(s) 1110 through the interconnect 1130 are a network adapter 1140 and a storage adapter 1150. The network adapter 1140 provides the computer 1100 with the ability to communicate with remote devices, over a network and may be, for example, an Ethernet adapter or Fibre Channel adapter. The network adapter 1140 may also provide the computer 1100 with the ability to communicate with other computers. The storage adapter 1150 allows the computer 1100 to access a persistent storage, and may be, for example, a Fibre Channel adapter or SCSI adapter.

The code 1170 stored in memory 1120 may be implemented as software and/or firmware to program the processor(s) 1110 to carry out actions described above. In certain embodiments, such software or firmware may be initially provided to the computer 1100 by downloading it from a remote system through the computer 1100 (e.g., via network adapter 1140).

The techniques introduced herein can be implemented by, for example, programmable circuitry (e.g., one or more microprocessors) programmed with software and/or firmware, or entirely in special-purpose hardwired circuitry, or in a combination of such forms. Special-purpose hardwired circuitry may be in the form of, for example, one or more application-specific integrated circuits (ASICs), programmable logic devices (PLDs), field-programmable gate arrays (FPGAs), etc.

Software or firmware for use in implementing the techniques introduced here may be stored on a machine-readable storage medium and may be executed by one or more general-purpose or special-purpose programmable microprocessors. A "machine-readable storage medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible storage medium includes recordable/non-recordable media (e.g., read-only memory (ROM); random access memory (RAM); magnetic disk storage media; optical storage media; flash memory devices; etc.), etc.

The term "logic", as used herein, can include, for example, programmable circuitry programmed with specific software and/or firmware, special-purpose hardwired circuitry, or a combination thereof.

In addition to the above mentioned examples, various other modifications and alterations of the invention may be made without departing from the invention. Accordingly, the above disclosure is not to be considered as limiting and the appended claims are to be interpreted as encompassing the true spirit and the entire scope of the invention.

What is claimed is:

1. A method for resolving synchronization conflicts when synchronizing application state data between computing devices, comprising:

detecting, at a server, a first set of application state data at a first computing device conflicting with a second set of application state data at a second first computing device, wherein the first set of application state data represents an application state of a computer application running at the first computing device, and the second set of application state data represents another application state of the computer application running at the second computing device;

receiving, from the first computing device at the server, a signal indicating that a user has chosen the second set as a preferred set of application state data via an user interface generated by the first computing device, wherein the user interface presents metadata of the first and second sets of application state data including identifications of the first and second computing devices, device types or models of the first and second computing devices, timestamps indicating when the first and second sets of application state data was generated, an identification of the computer application, or progress information indicative of application states represented by the first and second sets of application state data; and transferring, to the first computing device, the second set of application state data to overwrite the first set of application state data at the first computing device.

2. The method of claim 1, wherein the receiving comprises:

receiving, from the first computing device at the server, a signal indicating that a user has chosen the second set as a preferred set of application state data, for the conflict and future conflicts for the computer application, via an user interface generated by the first computing device.

3. A computer-implemented method comprising:

sending, from a first computing device to a server, a signal indicating that a first set of application state data has been generated, wherein the first set of application state data represents an application state of a computer application running at the first computing device;

receiving, at the first computing device from the server, a message indicating that a second set of application state data for the computer application has been generated at a second computing device, wherein the second set of application state data conflicts with the first set of application state data;

presenting, at the first computing device, a user interface prompting a user to choose a preferred set of application state data between the first and second sets of application state data, wherein the user interface further includes an option for the user to choose not to synchronize the application state data of the computer application between the first and second computing devices; and if the user chooses the second set of application state data as the preferred set, requesting from the server the second set of application state data to overwrite the first set of application state data at the first computing device.

4. The computer-implemented method of claim 3, further comprising:

starting running the computer application at the first computing device, wherein the computer application has run at the second computing device.

5. The computer-implemented method of claim 3, further comprising:

generating, at the first computing device, the first set of application state data for the computer application.

6. The computer-implemented method of claim 3, wherein the first computing device synchronizes the preferred set of application state data for the computer application with the second computing device via the server based on what the user chooses between the first and second sets of application state data.

7. The computer-implemented method of claim 3, wherein the user interface presents metadata of the first and second sets of application state data.

8. The computer-implemented method of claim 7, wherein the metadata include identifications of the first and second computing devices, device types or models of the first and second computing devices, timestamps indicating when the first and second sets of application state data was generated, an identification of the computer application, or progress information indicative of application states represented by the first and second sets of application state data.

9. The computer-implemented method of claim 3, wherein the user interface further prompts the user to decide whether the choice of the preferred set of application state data applies to future conflicts for the computer application.

10. The computer-implemented method of claim 9, further comprising:

when there is a conflict between a set of application state data for the computer application at the first computing device and another set of application state data for the computer application at the second computing device, automatically choosing between the set and the other set, by the first computing device, based on the users choice of the preferred set of application state data without presenting a further user interface prompting the user to decide.

11. The computer-implemented method of claim 3, wherein the user interface is generated by an operating system of the computing device, instead of the computer application running at the computing device.

12. The computer-implemented method of claim 3, wherein the user interface further enables the user to specify a time period or recurring time periods for which the choice of the preferred set of application state data applies to future conflicts for the computer application.

13. The computer-implemented method of claim 3, wherein the user interface further enables the user to specify one or more locations at which the choice of the preferred set of application state data applies to future conflicts for the computer application.

14. The computer-implemented method of claim 3, further comprising:

If the user chooses the first set of application state data as the preferred set, transferring, from the first computing device to the server, the first set of application state data so that the server can relay the first set to the second computing device to overwrite the second set of application state data at the second computing device.

15. A computing device comprising:

a network interface configured to communicate with a server;

a storage component storing a first set of application state data representing an application state of a computer application running at the computing device;

an output component configured to present user interfaces;

a processor configured to run the computer application and an operating system of the computing device; and a memory component storing instructions of the operating system which, when executed by the processor, cause the operating system to perform a process including:

receiving, from the server, a message indicating that a second set of application state data for the computer application has been generated at a second computing device, wherein the second set of application state data conflicts with the first set of application state data;

presenting, via the output component, a user interface prompting a user to choose a preferred set of application state data between the first and second sets of application state data; and if the user chooses the second set of application state data, requesting, from the server, the second set of application state data to overwrite the first set of application state data stored in the storage component, wherein the user interface presents metadata of the first and second sets of application state data including identifications of the first and second computing devices, device types or models of the first and second computing devices, timestamps indicating when the first and second sets of application state data was generated, an identification of the computer application, or progress information indicative of application states represented by the first and second sets of application state data.

16. The computing device of claim 15, wherein the computing device synchronizes the application state data for the computer application with the second computing device via the server.

17. The computing device of claim 15, wherein the server is a cloud storage service.

18. The computing device of claim 15, wherein the user interface further prompts the user to decide whether the choice of the preferred set of application state data applies to future conflicts for the computer application.

19. The computing device of claim 15, wherein the user interface further enables the user to specify a location of the computing device, a time period, or recurring time periods for which the choice of the preferred set of application state data applies to future conflicts for the computer application.

20. A computer-implemented method comprising:

sending, from a first computing device to a server, a signal indicating that a first set of application state data has been generated, wherein the first set of application state data represents an application state of a computer application running at the first computing device;

receiving, at the first computing device from the server, a message indicating that a second set of application state data for the computer application has been generated at a second computing device, wherein the second set of application state data conflicts with the first set of application state data;

presenting, at the first computing device, a user interface prompting a user to choose a preferred set of application state data between the first and second sets of application state data, wherein the user interface further prompts the user to decide whether the choice of the preferred set of application state data applies to future conflicts for the computer application; and if the user chooses the second set of application state data as the preferred set, requesting from the server the second set of application state data to overwrite the first set of application state data at the first computing device.

21. The computer-implemented method of claim 20, wherein the user interface presents metadata of the first and second sets of application state data including identifications of the first and second computing devices, device types or models of the first and second computing devices, timestamps indicating when the first and second sets of application state data was generated, an identification of the computer application, or progress information indicative of application states represented by the first and second sets of application state data.

22. The computer-implemented method of claim 20, further comprising:

when there is a conflict between a set of application state data for the computer application at the first computing device and another set of application state data for the computer application at the second computing device, automatically choosing between the set and the other set, by the first computing device, based on the users choice of the preferred set of application state data without presenting a further user interface prompting the user to decide.

* * * * *